United States Patent
Dodgson et al.

(10) Patent No.: US 10,248,442 B2
(45) Date of Patent: Apr. 2, 2019

(54) AUTOMATED PROVISIONING OF VIRTUAL MACHINES

(75) Inventors: David S Dodgson, Lansdale, PA (US); Ralph Farina, Downingtown, PA (US); James A Fontana, Mission Viejo, CA (US); Robert A Johnson, Pottstown, PA (US); David Maw, San Juan Capistrano, CA (US); Anthony Narisi, Glenmoore, PA (US)

(73) Assignee: Unisys Corporation, Blue Bell, PA (US)

(*) Notice: Subject to any disclaimer, the term of this patent is extended or adjusted under 35 U.S.C. 154(b) by 0 days.

(21) Appl. No.: 13/547,148

(22) Filed: Jul. 12, 2012

(65) Prior Publication Data

US 2014/0019959 A1  Jan. 16, 2014

(51) Int. Cl.
  *G06F 9/455* (2018.01)
  *G06F 21/60* (2013.01)
  *H04L 29/06* (2006.01)

(52) U.S. Cl.
  CPC .......... *G06F 9/455* (2013.01); *G06F 9/45558* (2013.01); *G06F 21/606* (2013.01); *H04L 63/0428* (2013.01); *H04L 63/065* (2013.01); *H04L 63/0823* (2013.01); *G06F 2009/45587* (2013.01); *G06F 2009/45595* (2013.01)

(58) Field of Classification Search
  CPC . G06F 2009/45562; G06F 2009/45587; G06F 21/606; G06F 9/455; G06F 9/45558; H04L 63/65; H04L 63/0823; H04L 63/0428

USPC .............................................................. 718/1
See application file for complete search history.

(56) References Cited

U.S. PATENT DOCUMENTS

| | | | |
|---|---|---|---|
| 6,367,012 B1* | 4/2002 | Atkinson et al. | 713/176 |
| 8,234,641 B2* | 7/2012 | Fitzgerald et al. | 718/1 |
| 2010/0049968 A1* | 2/2010 | Dimitrakos | H04L 63/0807 713/153 |
| 2010/0115101 A1* | 5/2010 | Lain | H04L 45/02 709/227 |
| 2011/0072522 A1* | 3/2011 | Koka et al. | 726/31 |
| 2012/0079566 A1* | 3/2012 | Barranco et al. | 726/4 |
| 2012/0084566 A1* | 4/2012 | Chin et al. | 713/175 |
| 2012/0265976 A1* | 10/2012 | Spiers et al. | 713/2 |
| 2013/0055252 A1* | 2/2013 | Lagar-Cavilla et al. | 718/1 |

* cited by examiner

*Primary Examiner* — Jacob D Dascomb

(57) ABSTRACT

Virtual machines in a network may be isolated by encrypting transmissions between the virtual machines with keys possessed only by an intended recipient. Within a network, the virtual machines may be logically organized into a number of community-of-interest (COI) groups. Each COI may use an encryption key to secure communications within the COI, such that only other virtual machines in the COI may decrypt the message. Virtual machines may be automatically provisioned with configuration information, such as the encryption keys, when the virtual machine is started. The provisioning information may be created based on a template stored on a configuration server.

20 Claims, 9 Drawing Sheets

AUTOMATED PROVISIONING OF VIRTUAL MACHINES

The present disclosure claims the benefit of commonly assigned U.S. Utility application Ser. No. 13/105,141, filed May 11, 2011, entitled "METHODS AND SYSTEMS FOR PROVIDING AND CONTROLLING CRYPTOGRAPHIC SECURE COMMUNICATIONS ACROSS UNSEX, ED NETWORKS". This Prior Application is also a continuation-in-part of the following four applications:
  a. U.S. Provisional Application Ser. No. 60/648,531, filed Jan. 31, 2005, entitled "INTEGRATED MULTI-LEVEL SECURITY SYSTEM", as a continuation-in-part; and
  b. U.S. Utility application Ser. No. 11/339,974, filed Jan. 26, 2006, entitled "INTEGRATED MULTI-LEVEL SECURITY SYSTEM" which itself is a continuation-in-part of Ser. No. 60/648,531 above, as a continuation-in-part; and
  c. U.S. Utility application Ser. No. 11/339,974, filed Jan. 26, 2006, entitled "SECURING AND PARTITIONING DATA IN MOTION USING A COMMUNITY OF INTEREST", which itself is a continuation-in-part of Ser. No. 11/339,374, as a continuation-in-part;
  d. U.S. patent application Ser. No. 12/272,012, entitled "BLOCK LEVEL DATA STORAGE SECURITY SYSTEM", filed 17 Nov. 2008, as a continuation-in-part.

The instant disclosure relates to network devices. More specifically, this disclosure relates to securing virtual machines executing on network devices and claims the benefit of commonly assigned U.S. Patent Applications:

1. U.S. Provisional Patent Application entitled: Distributed Security on Multiple Independent Networks using Secure "Parsing" Technology, by Robert Johnson, Ser. No. 60/648,531, filed 31 Jan. 2005;

2. U.S. patent application entitled: Integrated Multi-Level Security System, by Robert Johnson, Ser. No. 11/339,974 filed 26 Jan. 2006 claiming the benefit of the above provisional applications;

3. U.S. patent application entitled: Integrated Multi-Level Security System, by Robert Johnson et al., Ser. No. 11/714,590 filed 6 Mar. 2007 which is a continuation-in-part of U.S. application Ser. No. 11/339,974;

4. U.S. patent application entitled: Integrated Multi-Level Security System, by Robert Johnson et al., Ser. No. 11/714,666 filed 6 Mar. 2007 which is a continuation-in-part of U.S. application Ser. No. 11/339,974; and 5. U.S. patent application entitled: Integrated Multi-Level Security System, by Robert Johnson et al., Ser. No. 11/714,598 filed 6 Mar. 2007 which is a continuation-in-part of U.S. application Ser. No. 11/339,974.

6. U.S. patent application Ser. No. 12/272,012, entitled "Block Level Data Storage Security System", filed 17 Nov. 2008. The present disclosure also claims the benefit of commonly assigned U.S. patent application Ser. No. 12/336,558, entitled "Data Recovery Using Error Strip Identifiers", filed 17 Dec. 2008.

7 U.S. patent application Ser. No. 12/336,559 entitled "Storage Security Using Cryptographic Splitting", filed 17 Dec. 2008; U.S. patent application Ser. No. 12/336,562, entitled "Storage Security Using Cryptographic Splitting", filed 17 Dec. 2008; U.S. patent application Ser. No. 12/336,564, entitled "Storage Security Using Cryptographic Splitting", filed 17 Dec. 2008; and U.S. patent application Ser. No. 12/336,568, entitled "Storage Security Using Cryptographic SplittinG", filed 17 Dec. 2008.

8. U.S. patent application Ser. No. 12/342,636 entitled "Storage Communities Of Interest Using Cryptographic Splitting", filed 23 Dec. 2008. U.S. patent application Ser. No. 12/342,575, entitled "Storage Communities Of Interest Using Cryptographic Splitting", filed 23 Dec. 2008, U.S. patent application Ser. No. 12/342,610, entitled "Storage Communities Of Interest Using Cryptographic Splitting", filed 23 Dec. 2008, 11. U.S. patent application Ser. No. 12/342,379, entitled "Secure Network Attached Storage Device Using Cryptographic Splitting", filed 23 Dec. 2008.

These related applications are incorporated by reference herein in its entirety as if it is set forth in this application.

FIELD OF THE DISCLOSURE

Background

Virtual machines running in a cloud are not well protected from other machines in the cloud, or from devices with physical access to the cloud. For example, virtual machines executing in a cloud may receive communications from any device in the cloud. Further, data transmitted by the virtual machine in the cloud may be intercepted by unintended recipients.

In a conventional solution, a network may include a plurality of servers hosting virtual machines leased by tenants. The virtual machines may start and stop based on demand for the tenant's services. Because the virtual machines are frequently starting and stopping there are no dedicated resources for the tenant. This reduces the cost for the tenant, because resources are only used when they are needed. Thus, the tenant only pays for resources as they are used. However, because there is no leased hardware for the tenant, the tenant's virtual machines may start on any one of a number of server systems in the network.

For example, a tenant may be a customer owning one or more virtual machines executing within the network. Because the virtual machines execute on shared hardware with other virtual machines belonging to other tenants, the transmission to and/or from the virtual machine may be intercepted by another tenant. Conventional solutions for isolating hardware of one tenant from hardware of another tenant are not useful for improving security, because any tenant's virtual machine may execute on hardware with another tenant's virtual machines.

SUMMARY

Cryptography may be used protect communication between virtual machines. Each virtual machine may be configured to be members of one or more communities-of-interest (COI). When an attempt is made to initiate communication between virtual machines, a common COI may be identified. Communication may be performed by encrypting messages when sent and decrypting them on receipt using a cryptographic key possessed only by virtual machines of the COI. Non-members of the COI may be unable to view the message, despite sharing hardware or access to a network. In addition to organizing virtual machines into communities-of-interest, virtual machines may be organized into enclaves separated from other virtual machines by a virtual gateway. The virtual gateway may isolate the virtual machines in the enclave by controlling access between those virtual machines and the network outside the enclave. Within the enclave, transmission between virtual machines may be encrypted, and the virtual gateway may act as a gateway to unencrypted networks. Dynamic licensing may be implemented within the enclaves to allow virtual machines to obtain dynamic licenses through the virtual gateway. Thus, licenses for the virtual machines may move between virtual machines as the virtual machines are stopped and started. Further, the virtual machines within an enclave may be configured and/or provisioned automatically for encrypted communications.

According to one embodiment, a method includes receiving a message, from a first virtual machine, destined for a second virtual machine. The method also includes identifying a community-of-interest group common to the first virtual machine and the second virtual machine. The method further includes encrypting the message with a key corresponding to the community-of-interest.

According to another embodiment, a computer program product includes a non-transitory computer readable medium having code to receive a message, from a first virtual machine, destined for a second virtual machine. The medium also includes code to identify a community-of-interest group common to the first virtual machine and the second virtual machine. The medium further includes code to encrypt the message with a key corresponding to the community-of-interest.

According to yet another embodiment, an apparatus includes a memory, a network interface, and a processor coupled to the memory and to the network interface. The processor is configured to receive a message, from a first virtual machine, destined for a second virtual machine. The processor is also configured to identify a community-of-interest group common to the first virtual machine and the second virtual machine. The processor is further configured to encrypt the message with a key corresponding to the community-of-interest. The processor is also configured to transmit the message through the network interface.

According to one embodiment, a method includes receiving a message destined for a target virtual machine of a plurality of virtual machines. The method also includes identifying a community-of-interest corresponding to the target virtual machine. The method further includes encrypting the message with a key assigned to the identified community-of-interest. The method also includes transmitting the encrypted message to the target virtual machine.

According to another embodiment, a computer program product includes a non-transitory computer readable medium having code to receive a message destined for a target virtual machine of a plurality of virtual machines. The medium also includes code to identify a community-of-interest corresponding to the target virtual machine. The medium further includes code to encrypt the message with a key assigned to the identified community-of-interest. The medium also includes code to transmit the encrypted message to the target virtual machine.

According a further embodiment, an apparatus includes a memory, a network interface, and a processor coupled to the memory and to the network interface. The processor is configured to receive a message destined for a target virtual machine of a plurality of virtual machines. The processor is also configured to identify a community-of-interest corresponding to the target virtual machine. The processor is further configured to encrypt the message with a key assigned to the identified community-of-interest. The processor is also configured to transmit the encrypted message to the target virtual machine.

According to one embodiment, a method includes detecting a start-up of a virtual machine. The method also includes assigning a community-of-interest to the virtual machine. The method further includes configuring the virtual machine for communications with a virtual gateway in the community-of-interest.

According to another embodiment, a computer program product includes a non-transitory computer readable medium having code to detect a start-up of a virtual machine. The medium also includes code to assign a community-of-interest to the virtual machine. The medium further includes code to configure the virtual machine for communications with a virtual gateway in the community-of-interest.

According a further embodiment, an apparatus includes a memory, a network interface, and a processor coupled to the memory and to the network interface. The processor is configured to detect a start-up of a virtual machine. The processor is also configured to assign a community-of-interest to the virtual machine. The processor is further configured to configure the virtual machine for communications with a virtual gateway in the community-of-interest.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
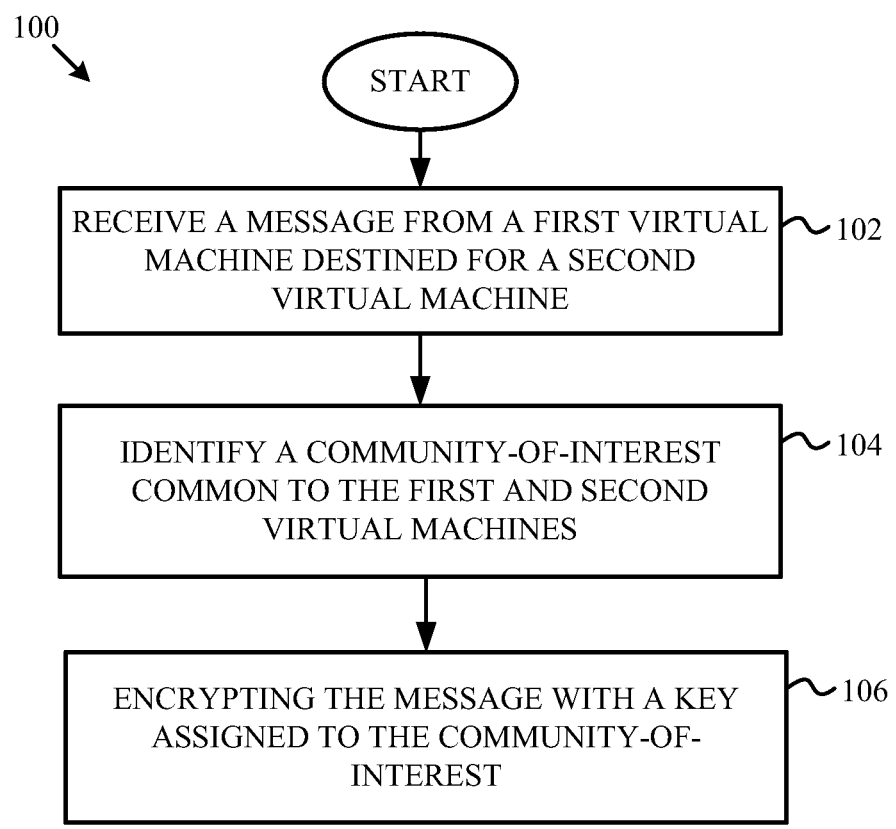
FIG. 1 is a flow chart illustrating a method for cryptographically isolating virtual machines according to one embodiment of the disclosure.

FIG. 1 is a flow chart illustrating a method for cryptographically isolating virtual machines according to one embodiment of the disclosure. A method 100 begins at block 102 with receiving a message from a first virtual machine destined for a second virtual machine. The second virtual machine may be hosted by the same server or a different server from the first virtual machine. The message may include information, such as application-layer data. The message may be formatted as packetized data according to, for example, a transmission control protocol/internet protocol (TCP/IP).

At block 104, a common community-of-interest is identified between the first and the second virtual machines. Virtual machines executing on one or more servers may each be assigned one or more communities-of-interest (COI). The communities-of-interest may allow an administrator to create logical organizations of virtual machines. A community-of-interest may be defined by a role of the virtual machines in the COI. For example, an administrative COI may be created for virtual machines handling administrative tasks. A community-of-interest may also be defined by the capabilities of the virtual machines in the COI. For example, a high-performance COI may be created for virtual machines having more than one processor available for calculations. The communities-of-interest may further be used to separate communications between virtual machines, even when the virtual machines of different communities-of-interest share a physical network connection and/or physical hardware.

A first virtual machine may identify whether the second virtual machine is a member of at least one community-of-interest with the first virtual machine by consulting a look-up table and/or querying the second virtual machine. When the first and the second virtual machine share several communities-of-interest, a priority scheme may be used to select a particular one of the communities-of-interest for transmitting the message. For example, a client community-of-interest group may be preferred over an administrative community-of-interest group. Further, a community-of-interest may also be prioritized based on other members of the community-of-interest, such as when the first virtual machine does not desire certain virtual machines other than the second virtual machine to be able to receive the message. For example, when multiple communities-of-interest are shared between the first and the second virtual machine, the community-of-interest with the least number of members may be prioritized for communications to limit potential eavesdroppers.

At block 106, the message is encrypted with a key corresponding to the community-of-interest. A session key may be created for transmitting the message from the first virtual machine to the second virtual machine. The session key may be encrypted with a key corresponding to the community-of-interest and transmitted from the first virtual machine to the second virtual machine. Only other virtual machines that are a member of the community-of-interest may decode the session key. The message received at block 102 may be transmitted with this session key, which may be only known to the second virtual machine. Thus, communications between the first and the second virtual machine may be cryptographically isolated from other virtual machines, particularly virtual machines owned by other tenants in the network. The encryption keys for the communities-of-interest may be installed from a secure boot device, such as disclosed in related U.S. patent application Ser. No. 13/105,173 which is hereby incorporated by reference.

Figure 2:
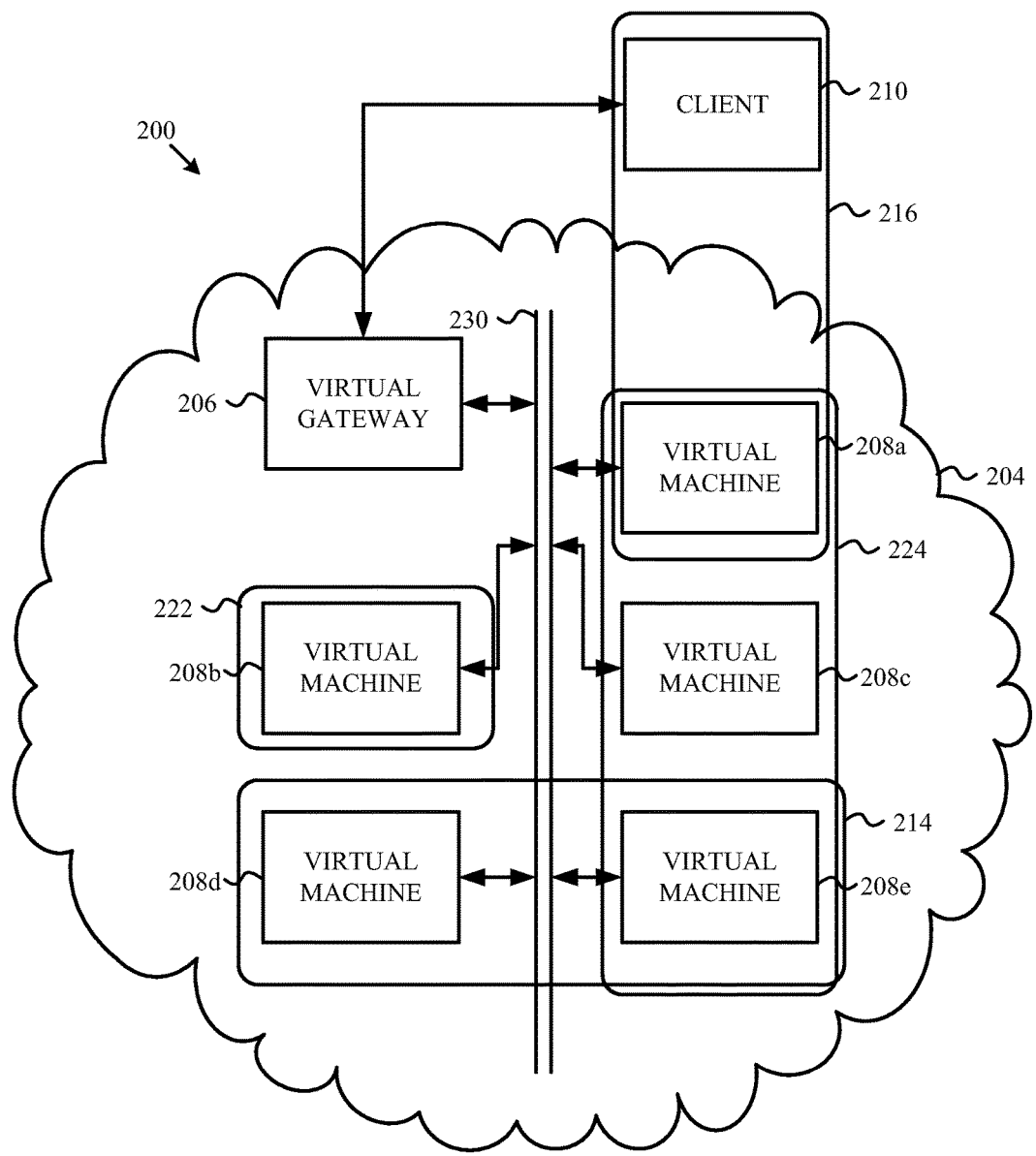
FIG. 2 is a block diagram illustrating an encrypted enclave of virtual machines organized into communities-of-interest according to one embodiment of the disclosure.

FIG. 2 is a block diagram illustrating an encrypted enclave of virtual machines organized into communities-of-interest according to one embodiment of the disclosure. A network 200 may include a network bus 230 serving an enclave 204. The bus 230 may couple virtual machines 208a-e within the enclave 204. Each of the virtual machines 208a-e may communicate through encrypted communications carried on the bus 230. Further, the bus 230 may be private to prevent access by unwanted guests. A virtual gateway 206 may be coupled to the bus 230 to provide communications from the enclave 204 to external devices, such as the client 210 and/or other public networks, such as the Internet. The client 210 may be a remote device, such as a personal computer or a mobile device. The client 210 may be connected to the virtual gateway 206 through a secured tunnel, such that communications between the client 210 and the virtual gateway 206 are encrypted similar to the encrypted communications on the bus 230. The client 210 may also be connected to the virtual gateway 206 through an unencrypted communications link, in which the communications with the client 210 are encrypted by the virtual gateway 206 for transmission on the bus 230 and communications from the bus 230 are decrypted for transmission to the client 210.

The virtual machines 208a-e may be assigned to one or more communities-of-interest (COI). For example, the virtual machines 208a, 208c, and 208e may be assigned to COI 224. In another example, the virtual machines 208d and 208e may be assigned to COI 214. Communities-of-interest may also include only a single virtual machine, such as when other virtual machines assigned to the COI have been stopped. For example, COI 222 may include the virtual machine 208b. Further, communities-of-interest may also include devices located outside of the enclave 204. For example, COI 216 may include the virtual machine 208a and the client 210.

A virtual machine 208e may be instructed to transmit a message to the virtual machine 208a. For example, software executing on the virtual machine 208e may request data from a database server executing on the virtual machine 208a. When the virtual machine 208e receives the message destined for the virtual machine 208a, the virtual machine 208e, or a device hosting the virtual machine 208e, may identify a community-of-interest in common between the virtual machine 208e and the virtual machine 208a. The COI 224 may be identified as a community-of-interest shared between the virtual machine 208e and the virtual machine 208a. Thus, a key corresponding to the COI 224 may be used to encrypt the message, which is then transmitted to the virtual machine 208a. The key may be a session key previously transmitted to the virtual machine 208a, after being generated by the virtual machine 208e and encrypted with a key for the COI 224.

Figure 3:
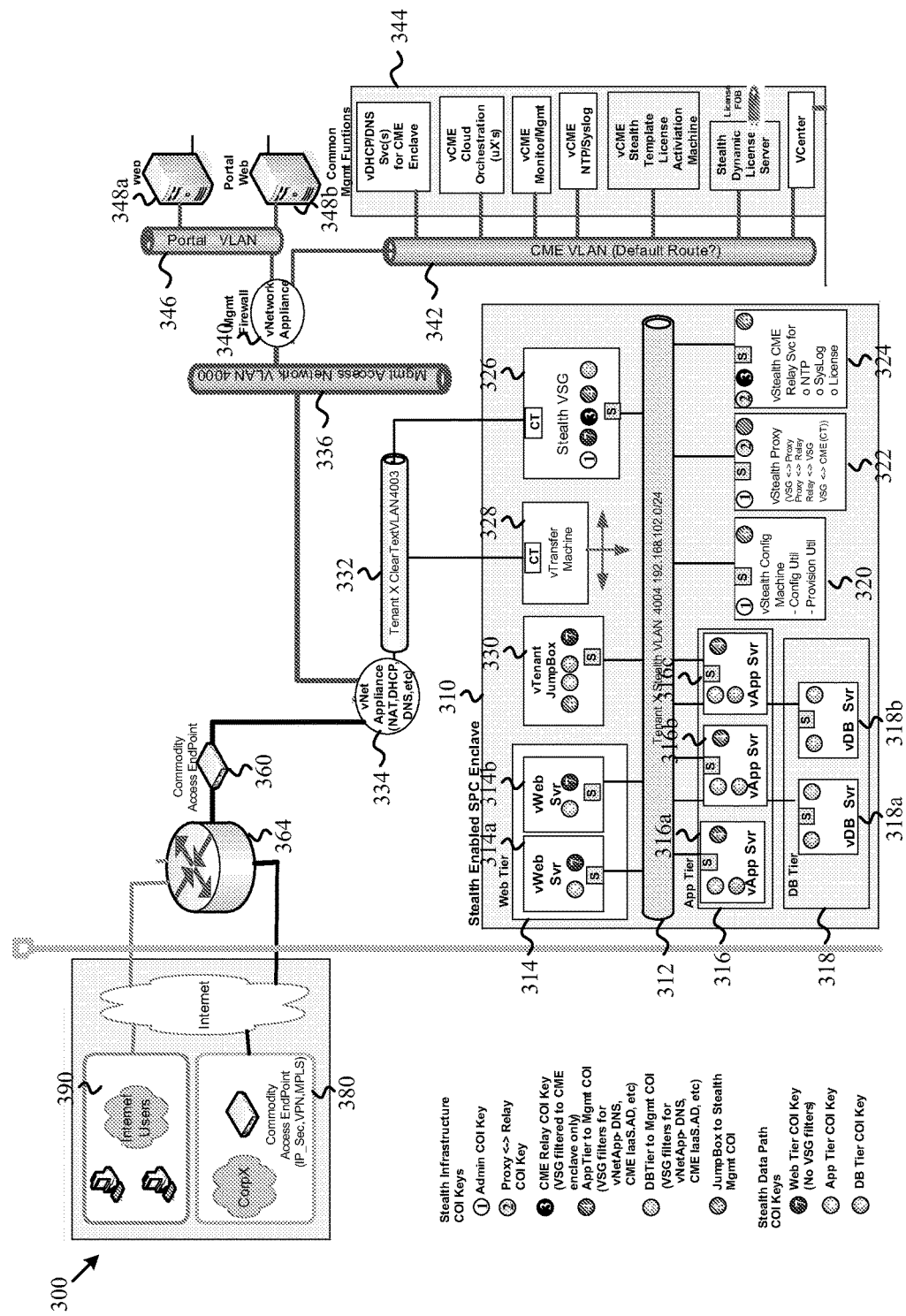
FIG. 3 is a block diagram illustrating a network implementing community-of-interests according to one embodiment of the disclosure.

The community-of-interest organization of virtual machines may be implemented in a computer network to provide cryptographic isolation of virtual machines. FIG. 3 is a block diagram illustrating a network implementing community-of-interests according to one embodiment of the disclosure. A network 300 may include an enclave 310. According to one embodiment, the enclave 310 may belong to a single tenant of the network 300. In other embodiments, the enclave 310 may be shared between tenants.

Communities-of-interests may be configured for a web tier 314, an application tier 316, and a database tier 318. The web tier 314 may include a number of web servers 314a-b, the application tier 316 may include a number of application servers 316a-c, and the database tier 318 may include a number of database servers 318a-b. Each of the servers 314a-b, 316a-c, and 318a-b may be a virtual server executing within a virtual machine. Additional communities-of-interest may be defined for infrastructure functions, such as an administrator community-of-interest key COI, a relay COI, an application tier management COI, a database tier management COI, and a jumpbox management COI. The enclave 310 may also include a jumpbox 330, a transfer machine 328, a virtual gateway 326, a relay 324, a proxy 322, and a configuration device 320, which may also be executing in virtual machines.

Membership of the virtual machines of FIG. 3 in individual COIs are shown as numbered circles. Each circle may represent a different COI, such as the web tier COI. For example, a web tier COI may include the servers 314a-b, the jumpbox 330, and the virtual gateway 326. According to one embodiment, only virtual machines that share a common COI may communicate. When a first virtual machine initiates communication with a second virtual machine, the first virtual machine may search for a common COI between the first and the second virtual machine. If found, a cryptographic session key may be created that is encrypted with a key associated with the common COI. Thus, only a virtual machine that shares the COI key may decrypt the session key. All communication between the two virtual machines may be encrypted and decrypted with the session key. Messages within the enclave 310 may be isolated from the rest of the network 300, because the messages are encrypted with keys that are not available to the rest of the network 300.

For example, a web server virtual machine 314a may be able to communicate with another web server virtual machine 314b, because the virtual machines 314a-b have the web tier COI in common. They may also be able to communicate with application server virtual machines 316a-c, because the machines 314a-b and 316a-c have the application tier COI in common.

Each of the devices within the enclave 310 may be coupled to a bus 312. When a device within the enclave 310 communicates with devices outside the enclave 310, then messages may be handled by the virtual gateway 326, which may be coupled to an unencrypted network 332. According to one embodiment, the virtual gateway 326 may encrypt and/or decrypt messages between the enclave 310 and the unencrypted network 332. The network 332 may couple the enclave 310 to other network appliances 334, such as network address translation (NAT) devices, dynamic host control protocol (DHCP) devices, domain name service (DNS) devices, and the like. The other network appliances 334 may also be executing in virtual machines.

Access to the enclave 310 may be controlled by the virtual gateway 326. Messages passing through the gateway 326 from the unencrypted, or clear-text, network 322 to the enclave 310 may be encrypted and messages in the other direction may be decrypted by the gateway 326. According to one embodiment, messages within the enclave 310 may only be transmitted to a virtual machine that has a COI in common with the gateway 326. Furthermore, the gateway 326 may be configured to filter messages for a COI. The filter may allow an administrator to restrict access based on a message's source and/or destination address and/or port. The enclave 310 may also be isolated from other enclaves (not shown) in the network 300, because only a virtual machine having a common COI with the gateway 326 may communicate outside of the enclave 310.

For example, the web servers 314a-b may be able to communicate through the gateway 326, because the web servers 314a-b share the web tier COI with the gateway 326. In another example, the application servers 316a-c and the database servers 318a-b may have restricted access through the gateway 326, because the gateway 326 may filter messages transmitted in the application COI and the database COI to only provide access to management devices 344.

Figure 4:
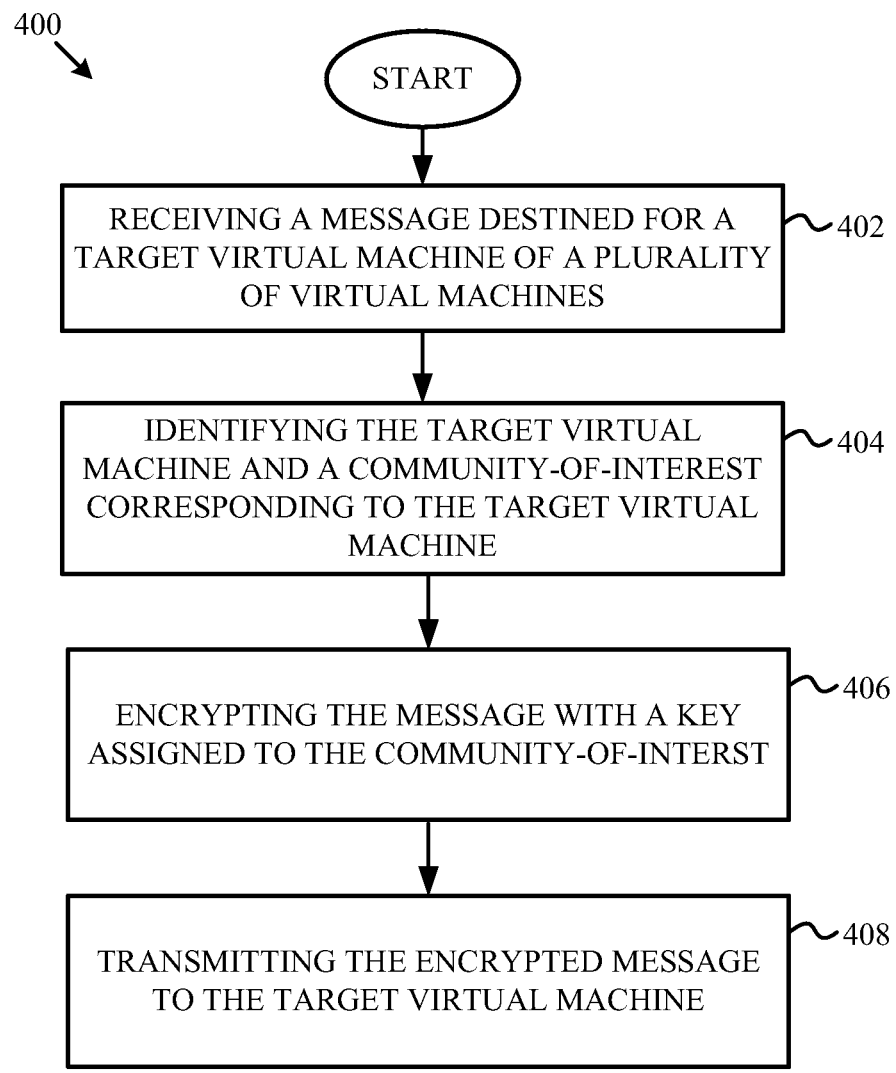
FIG. 4 is a flow chart illustrating a method for handling communications in an enclave by a virtual gateway according to one embodiment of the disclosure.

FIG. 4 is a flow chart illustrating a method for handling communications in an enclave by a virtual gateway according to one embodiment of the disclosure. A method 400 begins at block 402 with a virtual gateway, such as the virtual gateway 326 of FIG. 3, receiving a message destined for a target virtual machine of a plurality of virtual machines, such as the servers 314a-b, 316a-c, and 318a-b of the enclave 310 in FIG. 3. The message may be received through an unencrypted connection, such as the unencrypted network 332 of FIG. 3. The virtual gateway 326 may be executing on a virtual machine, such that the ports to the unencrypted network 332 and to the enclave 310 are virtual ports.

At block 404, the virtual gateway 326 identifies the target virtual machine of the plurality of virtual machines and identifies a community-of-interest corresponding to the target virtual machine. For example, the virtual gateway 326 may examine the message and determine a destination address is that of the database server 318a of FIG. 3. The virtual gateway 326 may then identify the database tier COI corresponding to the database server 318a. If no COI is shared between the gateway 326 and the target virtual machine, then the message may be dropped.

At block 406, the virtual gateway 326 encrypting the message with a key assigned to the identified community-of-interest. That is, the virtual gateway 326 may encrypt messages received from the unencrypted network 332 for transmission in the enclave 310. At block 408, the encrypted message may be transmitted to the target machine by the virtual gateway 326.

Although a process for encrypted received messages destined for the enclave 310 is described above, a similar process may be carried out for transmitting messages from the enclave 310 destined for the unencrypted network 332. For example, messages may be transmitted from a virtual machine in the enclave 310 to a device outside of the enclave 310 through the virtual gateway 326. The virtual machine may transmit the message to the virtual gateway 326 through a community-of-interest shared between the virtual machine and the virtual gateway 326. When the virtual gateway 326 receives the message, the virtual gateway 326 may decrypt the message and transmit the message onto the unencrypted network 332.

Referring back to FIG. 3, also coupled to the unencrypted network 332 may be a management access network 336, which may be a virtual local area network (VLAN). The management access network 336 may be split into a portal web VLAN 346 and a cloud management environment (CME) VLAN. A network appliance 340, such as a firewall, may separate the VLANs 342 and 346 from the network appliance 334. The portal web VLAN 346 may include portal web servers 348a-b. The CME VLAN 342 may include the management devices 344.

The management devices 344 may include, for example, a license server for issuing dynamic licenses. Dynamic licensing may be used to provision licenses to virtual machines within the enclave 310. For example, when a virtual machine starts executing the web server 314a, the virtual machine may request a dynamic license from the license server. According to one embodiment, requests for dynamic licenses may be collected by the virtual gateway 326 and transmitted to the license server. Dynamic licensing allows separation of the license configuration for computer software, such as in a virtual machine, from the device executing the computer software. Such a configuration provides additional flexibility in the deployment of devices, such as gateways, computers, and virtual machines on a computer network. Each virtual machine in the enclave 310 may use a license. The number of licenses in use at any particular time may be equal to the number of virtual machines that are active in the enclave 310. Dynamic licensing allows the licenses to be shared between enclaves based upon current use.

A virtual machine, such as a machine executing the application server 316a, may request a license from the virtual gateway 326. The gateway 326 may have a dynamic licensing service that tracks the number of licenses currently in use within the enclave 310. This service may periodically request licenses from a central location, such as the license server. The number requested may be a function of the number of licenses currently in use and an estimated number for future requests. The license server may respond to the request by either granting the licenses, or refusing the request if insufficient licenses are available. The licensing service of the gateway 326 may then attempt to obtain licenses from another license server, or reduce the number of licenses in the request.

According to one embodiment, the gateway 326 may not provide an address for receiving information from the unencrypted network 332. In this case, the gateway 326 may send license requests to the proxy 322 through the administrative COI. The proxy 322 may forward the request to the relay 324 through a proxy-relay COI. The relay 324 may then forward the request to the license server through the gateway 326 using the relay COI. Additional services may also be provided through the gateway 326, the relay 324, and the proxy 322, such as system logging service and/or network time protocol (NTP) services.

Figure 5:
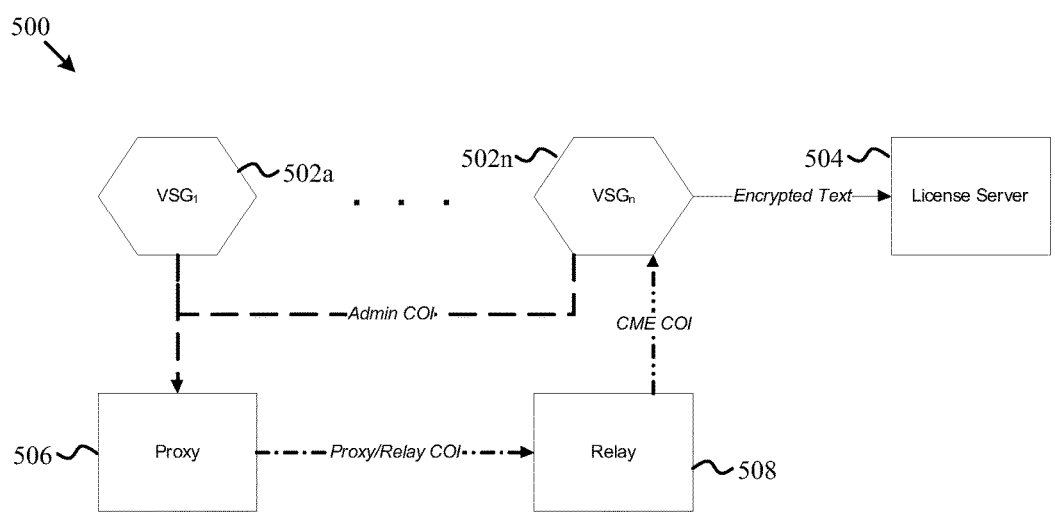
FIG. 5 is a block diagram illustrating communications between a gateway and a license server through a proxy and a relay according to one embodiment of the disclosure.

FIG. 5 is a block diagram illustrating communications between a gateway and a license server through a proxy and/or a relay according to one embodiment of the disclosure. A network 500 may include gateways 502a-502n, such as the gateway 326 of FIG. 3. Each of the gateways 502a-n may serve different enclaves, such as the enclave 310 of FIG. 3. The gateway 502n may be connected to a license server 504 through an encrypted connection. The gateway 502a may not have an encrypted connection to the license server 504. Instead, license requests for the gateway 502a may be transmitted to a proxy 506, and then to a relay 508. Communications between the proxy 506 and the relay 508 may take place through a proxy-relay COI. The relay 508 may then communicate with license server 504 through a CME COI. Messages containing granted licenses may reverse the path through the relay 508, the proxy 506, to the gateway 502a.

Referring back to FIG. 3, each virtual machine within the enclave 310 may be automatically provisioned with software for cryptographically isolating the virtual machine and/or automatically provisioned with appropriate COI assignments and keys. A certificate may be generated for each virtual machine. The keys for each COI in which the virtual machine is assigned may be wrapped with the certificate. The provisioning may be performed through special COIs. For example, a configuration machine may communicate with the gateway 326 through an administrative COI. The provisioning may also be performed through virtual devices. For example, the provisioning files may be stored on a virtual storage device, which is then attached to a virtual machine to allow the provisioning files to be copied from the virtual storage device to the virtual machine.

Infrastructure virtual machines, such as those executing the proxy 322, the relay 324, and/or the gateway 326, may be automatically generated from templates stored on a configuration server. One of the automatically generated infrastructure virtual machines may be a transfer machine 328, which connects to the unencrypted network 332 and uses application program interfaces (APIs) to communicate with a virtual machine within the enclave 310. The transfer machine 328 may transfer configuration information, such as a dynamic license and/or certificates, to virtual machines in the enclave 310.

Figure 6:
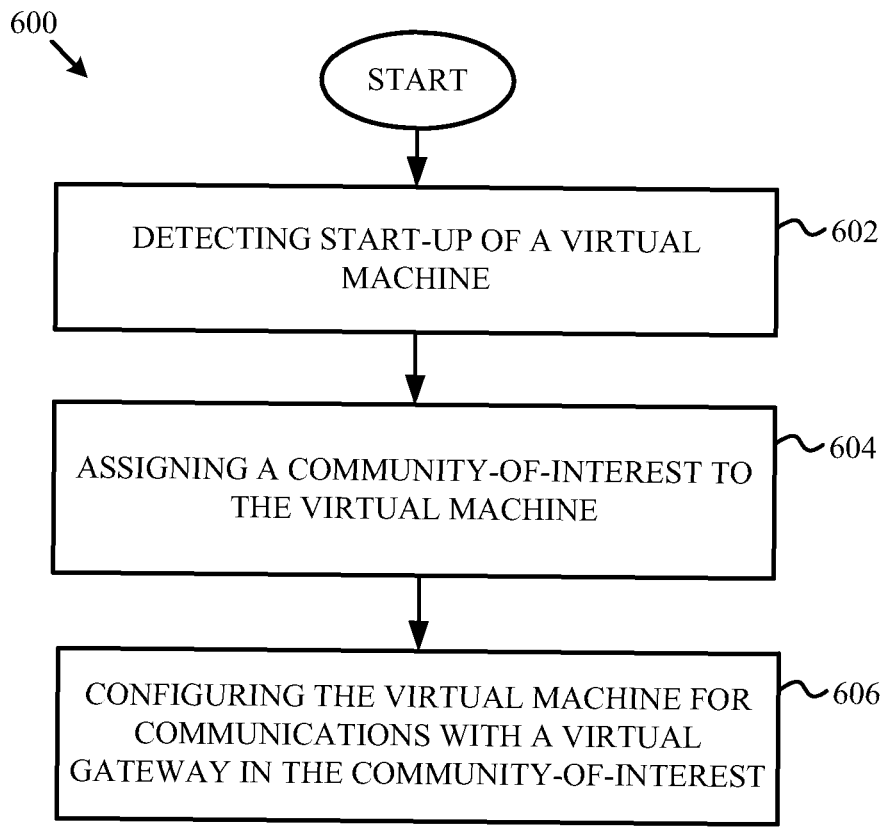
FIG. 6 is a flow chart illustrating a method for automatically provisioning virtual machines according to one embodiment of the disclosure.

FIG. 6 is a flow chart illustrating a method for automatically provisioning virtual machines according to one embodiment of the disclosure. A method 600 begins at block 602 with detecting a startup of a virtual machine. The virtual machine may be called to start when processing demand exceeds current capacity. For example, the web server 314b may be called to start on a virtual machine when demand on the web server 314a exceeds a certain limit, such as 80% of the capacity of the web server 314a.

At block 604, the virtual machine may be assigned to a community-of-interest. For example, the web server 314b may be assigned to the web tier COI. When assigning a virtual machine to a community-of-interest, an encryption key corresponding to the community-of-interest may be loaded in the virtual machine. More than one community-of-interest may be assigned to the virtual machine. If several communities-of-interest are assigned to the virtual machine, then several encryption keys corresponding to each of the communities-of-interest may be loaded in the virtual machine. Although the example provided above is for the web server 314b, other virtual machines may be automatically configured, such as a virtual machine for executing the virtual gateway 326.

At block 606, the virtual machine may be configured for communications with a virtual gateway in the community-of-interest, when the virtual machine being configured is not a virtual gateway. That is, when the web server 314b is started and automatically provisioned, the web server 314b may be configured with an address for the virtual gateway 326 to communicate outside of the assigned communities-of-interest.

Referring back to FIG. 3, access to the enclave 310 may be controlled through network configuration. A tenant may access the enclave 310 through a commodity access endpoint device 380 or through the Internet-connected devices 390. The devices 380 and 390 may be separated from the enclave 310 by a network router 364, which may provide public network access to the enclave 310. A tenant may also access the enclave 310 through a commodity access end point 360 located on a private-side of the router 364.

A connection through the commodity access endpoints 380 and 360, for example using IP security (IP-SEC) or multi-protocol label switching (MPLS), may connect to a virtual network appliance in the network 300. The appliance may be configured to connect to the enclave 310 through the gateway 326 using a network VLAN, such as the unencrypted network 332. Traffic from the appliance may also be routed to the web portals 348a-b. A tenant administrator may log on to the portals 348a-b to perform management functions of the enclave 310. The portals 348a-b may provide access to information from the common management enclave (CME) 344. The tenant administrator may also connect to a jumpbox 330 in the enclave 310. The jumpbox 330 may provide access to the other virtual machines in the enclave 310 to the administrator at the web portals 348a-b when the administrator is not connected to the encrypted network 312.

Figure 7:
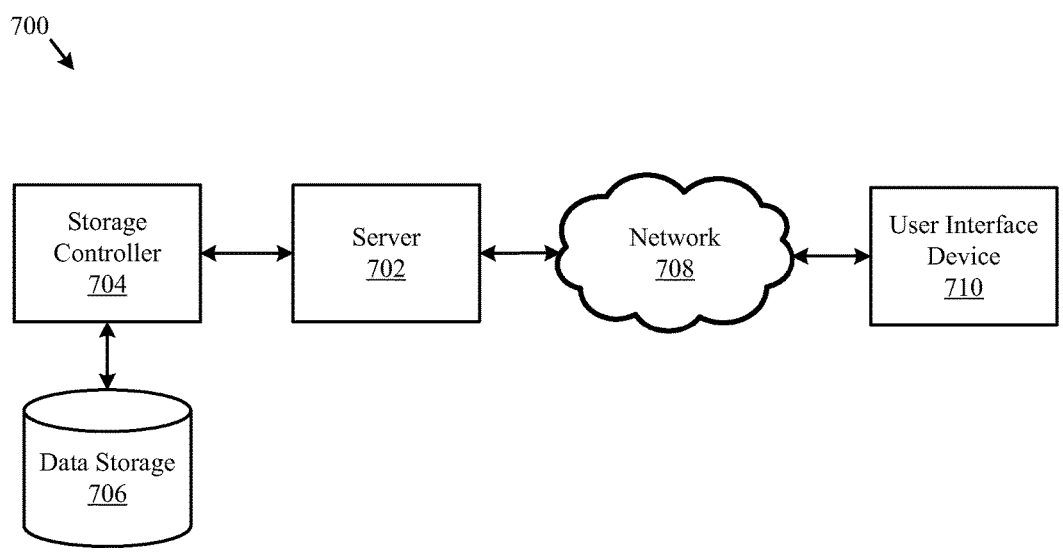
FIG. 7 is a block diagram illustrating a computer network according to one embodiment of the disclosure.

FIG. 7 illustrates one embodiment of a system 700 for an information system, which may host virtual machines. The system 700 may include a server 702, a data storage device 706, a network 708, and a user interface device 710. The server 702 may be a dedicated server or one server in a cloud computing system. The server 702 may also be a hypervisor-based system executing one or more guest partitions. The user interface device 710 may be, for example, a mobile device operated by a tenant administrator. In a further embodiment, the system 700 may include a storage controller 704, or storage server configured to manage data communications between the data storage device 706 and the server 702 or other components in communication with the network 708. In an alternative embodiment, the storage controller 704 may be coupled to the network 708.

In one embodiment, the user interface device 710 is referred to broadly and is intended to encompass a suitable processor-based device such as a desktop computer, a laptop computer, a personal digital assistant (PDA) or tablet computer, a smartphone or other a mobile communication device having access to the network 708. The user interface device 710 may be used to access a web service executing on the server 702. When the device 710 is a mobile device, sensors (not shown), such as a camera or accelerometer, may be embedded in the device 710. When the device 710 is a desktop computer the sensors may be embedded in an attachment (not shown) to the device 710. In a further embodiment, the user interface device 710 may access the Internet or other wide area or local area network to access a web application or web service hosted by the server 702 and provide a user interface for enabling a user to enter or receive information.

The network 708 may facilitate communications of data, such as dynamic license request messages, between the server 702 and the user interface device 710. The network 708 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

In one embodiment, the user interface device 710 accesses the server 702 through an intermediate sever (not shown). For example, in a cloud application the user interface device 710 may access an application server. The application server may fulfill requests from the user interface device 710 by accessing a database management system (DBMS). In this embodiment, the user interface device 710 may be a computer or phone executing a Java application making requests to a JBOSS server executing on a Linux server, which fulfills the requests by accessing a relational database management system (RDMS) on a mainframe server.

Figure 8:
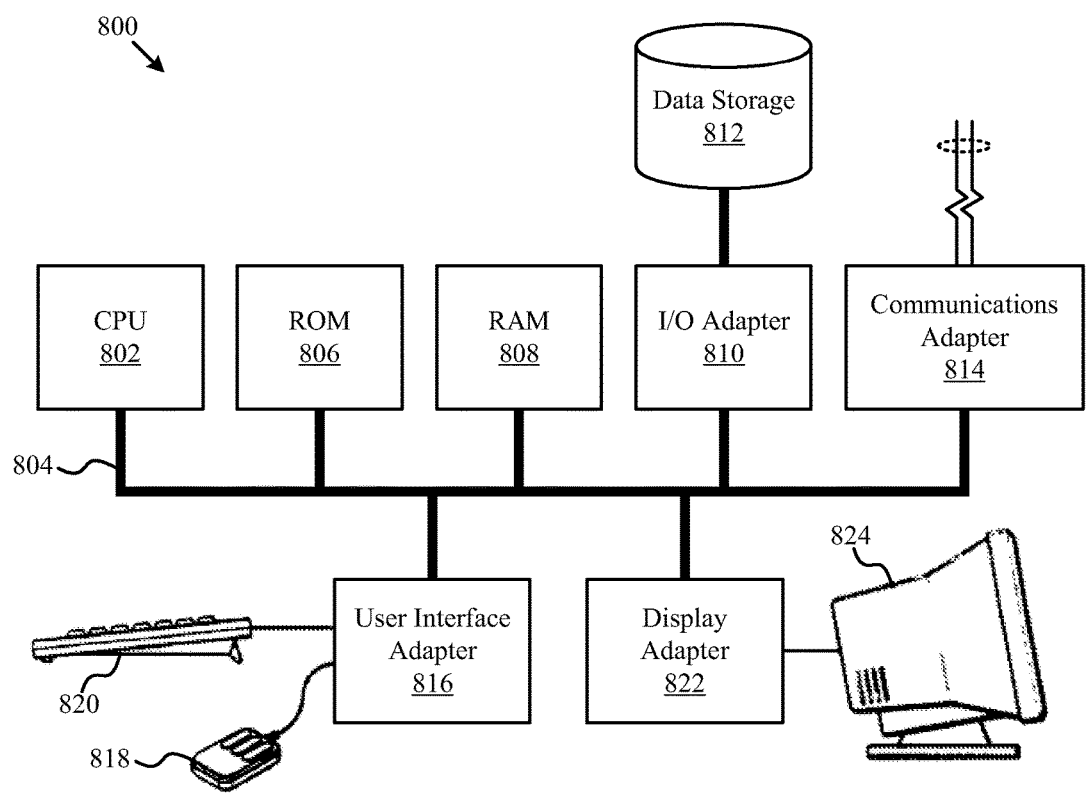
FIG. 8 is a block diagram illustrating a computer system according to one embodiment of the disclosure.

FIG. 8 illustrates a computer system 800 adapted according to certain embodiments of the server 702 and/or the user interface device 710. The central processing unit ("CPU") 802 is coupled to the system bus 804. The CPU 802 may be a general purpose CPU or microprocessor, graphics processing unit ("GPU"), and/or microcontroller. The present embodiments are not restricted by the architecture of the CPU 802 so long as the CPU 802, whether directly or indirectly, supports the operations as described herein. The CPU 802 may execute the various logical instructions according to the present embodiments.

The computer system 800 also may include random access memory (RAM) 808, which may be synchronous RAM (SRAM), dynamic RAM (DRAM), synchronous dynamic RAM (SDRAM), or the like. The computer system 800 may utilize RAM 808 to store the various data structures used by a software application. The computer system 800 may also include read only memory (ROM) 806 which may be PROM, EPROM, EEPROM, optical storage, or the like. The ROM may store configuration information for booting the computer system 800. The RAM 808 and the ROM 806 hold user and system data, and both the RAM 808 and the ROM 806 may be randomly accessed.

The computer system 800 may also include an input/output (I/O) adapter 810, a communications adapter 814, a user interface adapter 816, and a display adapter 822. The I/O adapter 810 and/or the user interface adapter 816 may, in certain embodiments, enable a user to interact with the computer system 800. In a further embodiment, the display adapter 822 may display a graphical user interface (GUI) associated with a software or web-based application on a display device 824, such as a monitor or touch screen.

The I/O adapter 810 may couple one or more storage devices 812, such as one or more of a hard drive, a solid state storage device, a flash drive, a compact disc (CD) drive, a floppy disk drive, and a tape drive, to the computer system 800. According to one embodiment, the data storage 812 may be a separate server coupled to the computer system 800 through a network connection to the I/O adapter 810. The communications adapter 814 may be adapted to couple the computer system 800 to the network 708, which may be one or more of a LAN, WAN, and/or the Internet. The communications adapter 814 may also be adapted to couple the computer system 800 to other networks such as a global positioning system (GPS) or a Bluetooth network. The user interface adapter 816 couples user input devices, such as a keyboard 820, a pointing device 818, and/or a touch screen (not shown) to the computer system 800. The keyboard 820 may be an on-screen keyboard displayed on a touch panel. Additional devices (not shown) such as a camera, microphone, video camera, accelerometer, compass, and or gyroscope may be coupled to the user interface adapter 816. The display adapter 822 may be driven by the CPU 802 to control the display on the display device 824. Any of the devices 802-822 may be physical and/or logical.

The applications of the present disclosure are not limited to the architecture of computer system 800. Rather the computer system 800 is provided as an example of one type of computing device that may be adapted to perform the functions of a server 702 and/or the user interface device 710. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 800 may be virtualized for access by multiple users and/or applications.

Figure 9A:
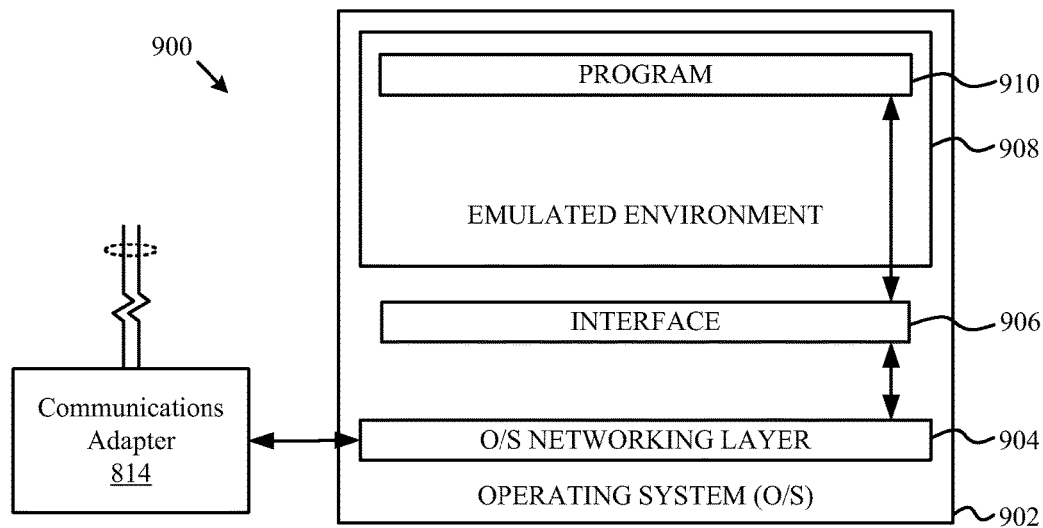
FIG. 9A is a block diagram illustrating a server hosting an emulated software environment for virtualization according to one embodiment of the disclosure.

FIG. 9A is a block diagram illustrating a server hosting an emulated software environment for virtualization according to one embodiment of the disclosure. An operating system 902 executing on a server includes drivers for accessing hardware components, such as a networking layer 904 for accessing the communications adapter 814. The operating system 902 may be, for example, Linux. An emulated environment 908 in the operating system 902 executes a program 910, such as CPCommOS. The program 910 accesses the networking layer 904 of the operating system 902 through a non-emulated interface 906, such as XNIOP. The non-emulated interface 906 translates requests from the program 910 executing in the emulated environment 908 for the networking layer 904 of the operating system 902.

Figure 9B:
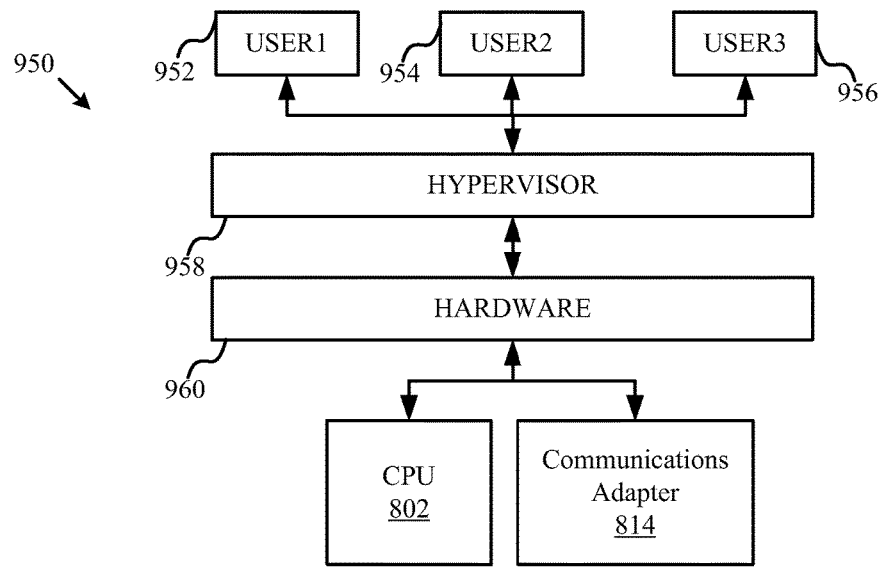
FIG. 9B is a block diagram illustrating a server hosting an emulated hardware environment according to one embodiment of the disclosure.

In another example, hardware in a computer system may be virtualized through a hypervisor. FIG. 9B is a block diagram illustrating a server hosting an emulated hardware environment according to one embodiment of the disclosure. Users 952, 954, 956 may access the hardware 960 through a hypervisor 958. The hypervisor 958 may be integrated with the hardware 960 to provide virtualization of the hardware 960 without an operating system, such as in the configuration illustrated in FIG. 9A. The hypervisor 958 may provide access to the hardware 960, including the CPU 802 and the communications adaptor 814.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A computer-implemented method for automatically provisioning virtual machines within a programmable processing system, the method comprising:
   detecting when processing demand within the programmable processing system exceeds a predefined capacity limit;
   starting a virtual machine when processing demand exceeded the predefined capacity limit;
   assigning at least one community-of-interest to the virtual machine when the processing demand on the virtual machine is detected to have exceeded the predefined capacity limit, wherein the virtual machine and other virtual machines within the community-of-interest form an enclave; and
   configuring the virtual machine for communications with a virtual gateway in the community-of-interest, wherein a client communicates with virtual machines of the enclave through the virtual gateway;
   wherein all virtual machines within the enclave communicate with each other through a common bus, the common bus is encrypted with a key of the community-of-interest;
   wherein the virtual gateway decrypts a communication when communicating with the client; and
   wherein the community-of-interest being defined by a role played by the virtual machine in the community of interest and by capabilities of the virtual machine.

2. The method of claim 1, in which the community-of-interest (COI) is at least one of an application tier COI, a web tier COI, a database COI, and an administrative COI.

3. The method of claim 1, in which the step of assigning the community-of-interest to the virtual machine comprises transmitting the certificate to the virtual machine, in which the certificate includes a community-of-interest key corresponding to the assigned community-of-interest wrapped in the certificate.

4. The method of claim 3, in which the step of transmitting a certificate to the virtual machine comprises transmitting an encryption key, in which the encryption key is encrypted with the community-of-interest key.

5. The method of claim 4, in which the step of transmitting the certificate comprises transmitting the certificate from a jumpbox coupled to the virtual machine.

6. The method of claim 1, in which the step of assigning the community-of-interest comprises copying a template from a configuration server to the virtual machine.

7. The method of claim 1, further comprising assigning a dynamic license to the virtual machine.

8. A computer program product, comprising:
   a non-transitory computer readable medium containing encoded data that when executed by a programmable computing device causes the device to perform a process, the computer program product comprising:

code to detect when processing demand on within the computer program product exceeds a predefined capacity limit;
code to start a virtual machine when processing demand is detected to have exceeded the predefined capacity limit;
code to assign at least one community-of-interest to the virtual machine when the processing demand is detected to have exceeded the predefined capacity limit, wherein the virtual machine and other virtual machines within the community-of-interest form an enclave; and
code to configure the virtual machine for communications with a virtual gateway in the community-of-interest, wherein a client communicates with virtual machines of the enclaves through the virtual gateway;
wherein all virtual machines within the enclave communicate with each other through a common bus, the common bus is encrypted with a key of the community-of-interest;
wherein the virtual gateway decrypts a communication when communicating with the client; and
wherein the community of interest being defined by a role played by the virtual machine in the community of interest and by capabilities of the virtual machine.

9. The computer program product of claim 8, in which the community-of-interest (COI) is at least one of an application tier COI, a web tier COI, a database COI, and/or an administrative COI.

10. The computer program product of claim 8, in which the medium further comprises code to transmit a certificate to the virtual machine, in which the certificate includes a community-of-interest key corresponding to the assigned community-of-interest wrapped in the certificate.

11. The computer program product of claim 10, in which the medium further comprises code to transmit an encryption key, in which the encryption key is encrypted with the community-of-interest key.

12. The computer program product of claim 8, in which the medium further comprises code to copy a template from a configuration server to the virtual machine.

13. The computer program product of claim 8, in which the medium further comprises code to assign a dynamic license to the virtual machine.

14. An apparatus, comprising:
a memory;
a network interface; and
a processor coupled to the memory and to the network interface, in which the processor is configured:
to detect when processing demand exceeds a predefined capacity limit;
to assign at least one community-of-interest to the virtual machine when the processing demand is detected to have exceeded the predefined capacity limit, wherein the virtual machine and other virtual machines within the community-of-interest form an enclave; and
to configure the virtual machine for communications with a virtual gateway in the community-of-interest, wherein a client communicates with virtual machines of the enclave through the virtual gateway;
wherein all virtual machines within the enclave communicate with each other through a common bus, the common bus is encrypted with a key of the community-of-interest;
wherein the virtual gateway decrypts a communication when communicating with the client; and
wherein the community of interest being defined by a role played by the virtual machine in the community of interest and by capabilities of the virtual machine.

15. The apparatus of claim 14, in which the community-of-interest (COI) is at least one of an application tier COI, a web tier COI, a database COI, and/or an administrative COI.

16. The apparatus of claim 14, in which the processor is further configured to transmit a certificate to the virtual machine through the network interface, in which the certificate includes a community-of-interest key corresponding to the assigned community-of-interest wrapped in the certificate.

17. The apparatus of claim 16, in which the processor is further configured to transmit an encryption key, in which the encryption key is encrypted with the community-of-interest key.

18. The apparatus of claim 14, in which the processor is further configured to copy a template from a configuration server to the virtual machine.

19. The apparatus of claim 14, in which the processor is further configured to assign a dynamic license to the virtual machine.

20. The apparatus of claim 14, in which the processor is further configured to execute a virtual machine executing software for detecting start-up, assigning the community-of-interest, and configuring the virtual machine.

* * * * *